United States Patent
Sato et al.

(10) Patent No.: US 7,538,178 B2
(45) Date of Patent: May 26, 2009

(54) PROCESS FOR PRODUCING ALIPHATIC POLYESTER

(75) Inventors: Hiroyuki Sato, Fukushima-Ken (JP); Fumio Akutsu, Fukushima-Ken (JP); Fuminori Kobayashi, Fukushima-Ken (JP); Yasushi Okada, Fukushima-Ken (JP)

(73) Assignee: Kureha Corporation, Tokyo (JP)

( * ) Notice: Subject to any disclaimer, the term of this patent is extended or adjusted under 35 U.S.C. 154(b) by 358 days.

(21) Appl. No.: 10/575,468

(22) PCT Filed: Oct. 14, 2004

(86) PCT No.: PCT/JP2004/015557

§ 371 (c)(1),
(2), (4) Date: Apr. 12, 2006

(87) PCT Pub. No.: WO2005/035623

PCT Pub. Date: Apr. 21, 2005

(65) Prior Publication Data

US 2007/0073032 A1  Mar. 29, 2007

(30) Foreign Application Priority Data

Oct. 15, 2003  (JP)  ............................. 2003-355436

(51) Int. Cl.
*C08G 63/02* (2006.01)
*C08G 64/00* (2006.01)

(52) U.S. Cl. .................. 528/272; 422/129; 422/131; 502/150; 525/374; 525/375; 525/437; 528/271

(58) Field of Classification Search ................ 422/129, 422/131; 502/150; 528/271, 272; 525/374, 525/375, 437
See application file for complete search history.

(56) References Cited

U.S. PATENT DOCUMENTS 2,937,164 A * 5/1960 Brown et al. .............. 525/329.3
5,885,709 A * 3/1999 Wick et al. .................. 428/364

FOREIGN PATENT DOCUMENTS

| EP | 0 299 730 A2 | | 1/1989 |
|---|---|---|---|
| EP | 1 048 683 A1 | | 11/2000 |
| JP | 57-094019 | * | 6/1982 |
| JP | 10-25288 | | 1/1998 |

* cited by examiner

*Primary Examiner*—Terressa M Boykin
(74) *Attorney, Agent, or Firm*—Wenderoth, Lind & Ponack, L.L.P.

(57) ABSTRACT

An aliphatic polyester improved provided by using water positively as an initiator or/and a molecular weight-adjusting agent, is improved in moisture resistance. More specifically, a cyclic ester containing proton-source compounds including more than 80 ppm of water as an initiator or/and a molecular weight-adjusting agent, is subjected to ring-opening polymerization, and the resultant aliphatic polyester is compounded with a carboxyl group-capping agent to produce such an aliphatic polyester.

11 Claims, 2 Drawing Sheets

PROCESS FOR PRODUCING ALIPHATIC POLYESTER

TECHNICAL FIELD

The present invention relates to a process for producing an aliphatic polyester, such as polyglycolic acid, by ring-opening polymerization of a cyclic ester, such as glycolide, and more particularly to an improvement in process for producing an aliphatic polyester by subjecting a cyclic ester to ring-opening polymerization using water or moisture positively as an initiator or/and a molecular weight-adjusting agent.

BACKGROUND ART

Aliphatic polyesters, such as polyglycolic acid and polylactic acid, can be decomposed by microorganisms or enzymes present in nature, such as soil or sea water, so that they are noted as biodegradable polymer materials giving little load to the environment. Further, aliphatic polyesters are utilized as polymer materials for medical use, such as sutures for surgery or artificial skin, since they can be decomposed or absorbed in vivo.

Among the aliphatic polyesters, polyglycolic acid is excellent in gas-barrier properties, such as oxygen gas-barrier property, carbon dioxide gas-barrier property and water vapor-barrier property and also excellent in heat resistance and mechanical properties, and therefore the development of new use thereof is under way singly or in a composite state together with another resin material in the fields of packaging materials, etc.

An aliphatic polyester can be synthesized by dehydropolycondensation of an α-hydroxycarboxylic acid, such as glycolic acid or lactic acid, but in order to effectively synthesize an aliphatic polyester of a high molecular weight, there has been generally adopted a process of synthesizing a bimolecular cyclic ester of an α-hydroxycarboxylic acid and subjecting the cyclic ester to ring-opening polymerization. For example, by ring-opening polymerization of glycolide that is a bimolecular cyclic ester or cyclic diester of glycolic acid, polyglycolic acid is obtained. By ring-opening polymerization of lactide that is a bimolecular cyclic ester of lactic acid, polylactic acid is obtained.

A cyclic ester generally contains impurities including free carboxylic acid compounds, such as an α-hydroxycarboxylic acid used as the starting material and linear α-hydroxycarboxylic acid oligomers, and water. As impurities, such as water, even in a minute amount, can adversely affect the ring-opening polymerization of a cyclic ester, it has been proposed to use a high-purity cyclic ester from which impurities have been removed as far as possible in the ring-opening polymerization.

On the other hand, an alcohol such as a higher alcohol has been used as a molecular weight-adjusting agent in ring-opening polymerization of a cyclic ester in order to control the molecular weight of the aliphatic polyester. There has been also proposed a method of determining an addition amount of the alcohol based on the amount of free carboxylic acid compounds contained in the cyclic ester.

For example, in the ring-opening polymerization of glycolide, there has been proposed heretofore a method of using substantially pure glycolide purified by re-crystallization, etc. and also using a higher alcohol such as lauryl alcohol as a molecular weight-adjusting agent (e.g., Patent document 1b listed below).

Further, a purification method of removing impurities such as water from a cyclic ester (e.g., Patent document 2 listed below). In this document, it is pointed out that impurities, such as water, α-hydroxycarboxylic acid and low-molecular weight oligomers thereof, contained in a cyclic ester, should be removed, since they exert various functions as an initiator, a chain transfer agent, a catalyst deactivator, etc., to obstruct the ring-opening polymerization.

There has been proposed a process for producing an aliphatic polyester by ring-opening polymerization of a cyclic ester having a water content of at most 80 ppm and an acid value of at most 0.10 mg KOH/g (e.g., Patent document 3 listed below). This document contains a description to the effect that the reduction of water content in a cyclic ester accelerates the polymerization speed and allows the production of a high-molecular weight polymer, and the presence of an alcohol in the polymerization system suppresses the function of water content to allow the production of an aliphatic polyester of a good quality.

As a process for producing an aliphatic polyester by ring-opening polymerization of a cyclic ester, there has been proposed a production process characterized by determining the amount of a hydroxyl compound added to the reaction system based on the amount of free carboxylic acid compounds contained in the cyclic ester (e.g., Patent document 4 listed below). The document discloses α-hydroxycarboxylic acid used for production of the cyclic ester and linear oligomers of the α-hydroxycarboxylic acid as the free carboxylic acid compounds, and describes that monohydric linear saturated alcohols having 12-18 carbon atoms are preferred as the hydroxyl compound.

The document points out that if impurities, such as water and free carboxylic acid compounds, are contained in a cyclic ester, they adversely affects the polymerization reaction and it becomes impossible to effect a targeting, i.e., production of a polymer with an objective molecular weight, even under identical polymerization conditions. The document describes that the control of a molecular weight of aliphatic polyester is liable to be difficult at a large water content and it is preferred to control the water or moisture content in the cyclic ester to at most 100 ppm in order to accurately control the molecular weight.

The document further describes that water in a cyclic ester can be easily removed by purification and drying steps immediately before the polymerization, but free carboxylic acid compounds are difficult to remove and greatly affect the polymerization, and moreover, a cyclic ester is liable to cause ring-opening due to a minute amount of water during the storage to produce free carboxylic acid compounds anew. The document has proposed a process for producing an aliphatic polyester of a target molecular weight by determining the amount of free carboxylic acid compounds contained in a cyclic ester and adding an amount of hydroxyl compound (e.g., a higher alcohol) corresponding thereto.

Patent document 1: U.S. Pat. No. 3,442,871
Patent document 2: JP-A 8-301864
Patent document 3: JP-A 10-158371
Patent document 4: JP-B 3075665
Patent document 5: JP-A 2001-261797

As described above, water has been recognized as an impurity obstructing the ring-opening polymerization of a cyclic ester and should be removed as far as possible. However, water is the most universal compound present in nature, and the removal thereof as an impurity is confronted with a certain limit. The present inventors, et al, performed a detailed study about the function of water in the system of ring-opening polymerization of a cyclic ester and, as a result thereof, found it possible to control the molecular weight of a resultant aliphatic polyester by using a proton-source compound including water as a molecular weight-adjusting agent and controlling a total proton concentration in the cyclic ester to smoothly proceed with the ring-opening polymerization of a cyclic ester. Based on the knowledge, a process for producing an aliphatic polyester has been already proposed (WO2004/033527A).

DISCLOSURE OF INVENTION

A principal object of the present invention is to provide an improvement in the above-mentioned process for producing an aliphatic polyester.

More specifically, according to a study of the present inventors, the above-mentioned process for producing an aliphatic polyester is accompanied with a problem of low moisture resistance of the resultant aliphatic polyester, and the present invention aims at providing a process for producing an aliphatic polyester with an improved moisture resistance.

According to further study of the present inventors, the cause for a low moisture resistance of the aliphatic polyester produced through the above-mentioned process for producing an aliphatic polyester resides in the presence of carboxyl group in the resultant aliphatic polyester, and the present invention solves the problem by incorporating a carboxyl group-capping agent.

More specifically, in the process for producing an aliphatic polyester according to the present invention, an aliphatic polyester of a controlled molecular weight is produced by using a proton-source compound including water as an initiator or/and a molecular weight-adjusting agent, and an improved moisture resistance is provided by capping the carboxyl groups of the aliphatic polyester. More specifically, the present invention provides a process for producing an aliphatic polyester, comprising: subjecting a cyclic ester containing water in excess of 80 ppm as an initiator or/and a molecular weight-adjusting agent to ring-opening polymerization based on a total proton concentration in the cyclic ester as an index, and compounding a resultant aliphatic polyester with a carboxyl group-capping agent.

BEST MODE FOR PRACTICING THE INVENTION

Figure 1:
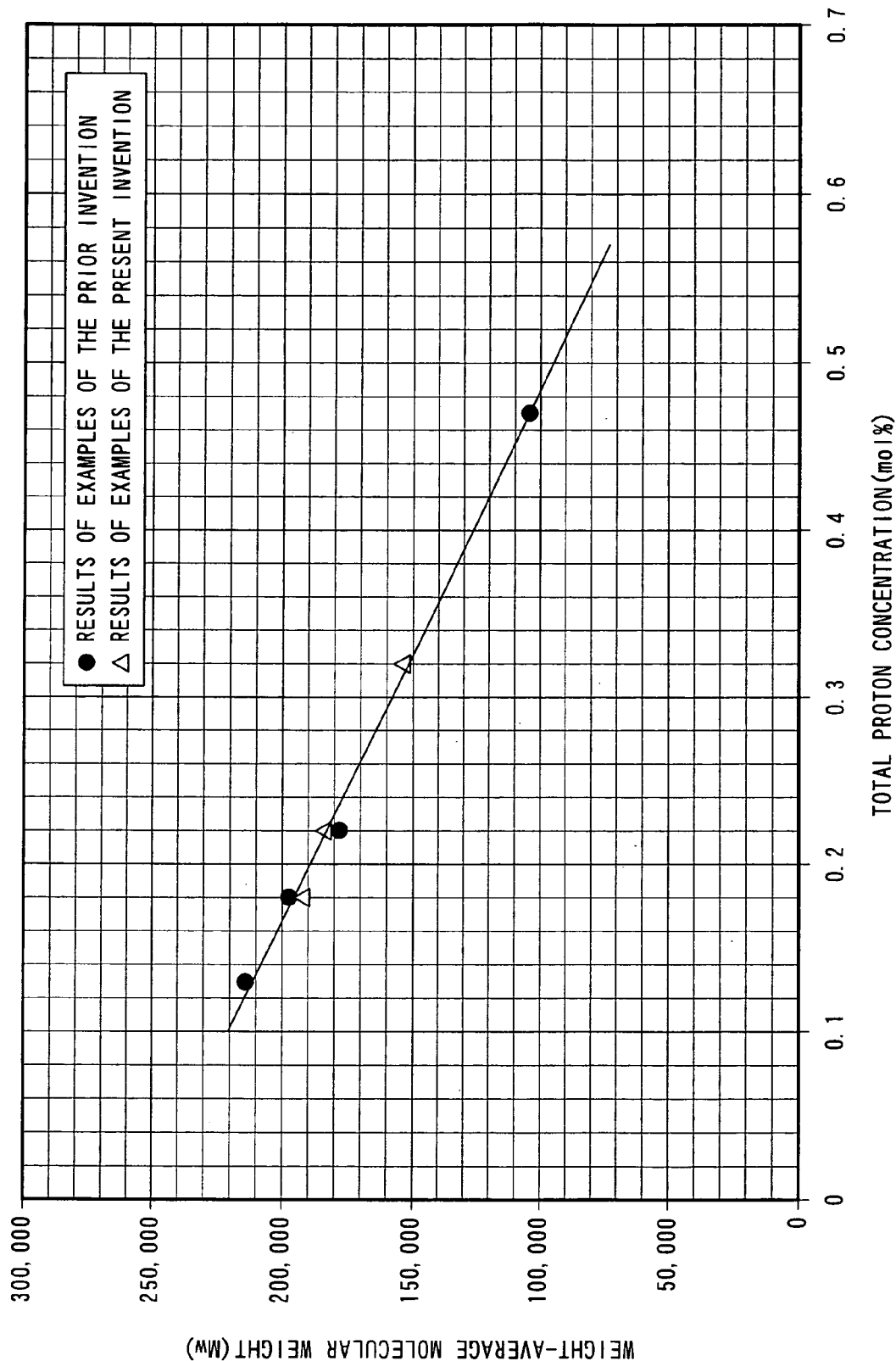
FIG. 1 is a data plot showing a correlation between weight-average molecular weights (Mw) of aliphatic polyesters obtained through the production process of the present invention and total proton concentrations in cyclic ester.

In short words, the process for producing an aliphatic polyester according to the present invention is characterized by compounding an aliphatic polyester produced through an invention of the above-mentioned WO2004/033527 (hereinafter referred to as "prior invention") with a carboxyl group-capping agent. Hereinafter the process for producing an aliphatic polyester according to the present invention is described along with the description of the prior invention.

1. Cyclic Ester

Preferred cyclic esters used in the present invention may include cyclic diesters of α-hydroxycarboxylic acids, lactones and cyclic ether-esters. Examples of the α-hydroxycarboxylic acids providing the cyclic diesters may include: glycolic acid, L- and/or D-lactic acid, α-hydroxybutanoic acid, α-hydroxyisobutanoic acid, α-hydroxyvaleric acid, α-hydroxycaproic acid, α-hydroxy-isocaproic acid, α-hydroxyheptanoic acid, α-hydroxy-octanoic acid, α-hydroxydecanoic acid, α-hydroxymyristic acid, α-hydroxystearic acid, and alkyl-substituted products thereof.

Examples of the lactones include β-propiolactone, β-butyrolactone, pivalolactone, γ-butyrolactone, δ-valerolactone, β-methyl-δ-valerolactone and α-caprolactone. The cyclic etheresters may include dioxanone, for example.

A cyclic ester having an asymmetric carbon atom may be any of a D-isomer, an L-isomer and a racemic mixture of these. These cyclic esters may be used either singly or in any combination thereof. When 2 or more cyclic esters are used in combination, an arbitrary aliphatic copolyester can be obtained. The cyclic ester may be copolymerized with another comonomer. Examples of such another comonomer include cyclic monomers such as trimethylene carbonate and 1,3-dioxanone.

Among the cyclic esters, glycolide, which is a cyclic diester of glycolic acid, L- and/or D-lactide, which is a cyclic diester of L- and/or D-lactic acid, and mixtures thereof are preferred, with glycolide being more preferred. Glycolide may be used alone. However, it may also be used in combination with another cyclic monomer to produce a polyglycolic acid copolymer (copolyester). When the polyglycolic acid copolymer is produced, it is desirable that a proportion of glycolide copolymerized is preferably at least 60% by weight, more preferably at least 70% by weight, particularly preferably at least 80% by weight from the viewpoint of physical properties of the copolyester formed, such as crystallinity and gas-barrier properties. Preferable examples of the cyclic monomer copolymerized with glycolide include lactide, ε-caprolactone, dioxanone and trimethylene carbonate.

No particular limitation is imposed on the production process of the cyclic ester. For example, glycolide can be obtained by a process comprising depolymerizing a glycolic acid oligomer. As the depolymerization process of the glycolic acid oligomer, may be adopted, for example, a melt depolymerization process described in U.S. Pat. No. 2,668,162, a solid-phase depolymerization process described in JP-A 2000-119269, or a solution-phase depolymerization process described in JP-A 328481/1997 and WO 02/14303A1. Glycolide obtained as a cyclic condensate of a chloroacetic acid salt, which is reported in K. Chujo, et al., Die Makromolekulare Cheme, 100 (1967), 262-266, can also be used.

Among the depolymerization processes described above, the solution-phase depolymerization process is preferred for obtaining glycolide. According to the solution-phase depolymerization process, (1) a mixture containing a glycolic acid oligomer and at least one high-boiling polar organic solvent having a boiling point within a range of 230-450° C. is heated to a temperature, at which the depolymerization of the oligomer takes place, under ordinary pressure or under reduced pressure; (2) the oligomer is dissolved in the solvent until a residual rate (volume ratio) of a melt phase of the oligomer reaches 0.5 or lower, (3) the heating is further continued at the same temperature to depolymerize the oligomer, (4) a cyclic diester (i.e., glycolide) formed is distilled out together with the high-boiling polar organic solvent, and (5) glycolide is recovered from the distillate.

Examples of the high-boiling polar organic solvent may include aromatic carboxylic acid esters, such as bis(alkoxyalkyl) phthalates such as di(2-methoxyethyl) phthalate, alkylene glycol dibenzoates such as diethylene glycol dibenzoate, benzylbutyl phthalate, and dibutyl phthalate; aromatic phosphoric acid esters such as tricresyl phosphate; and polyalkylene glycol ethers such as polyethylene dialkyl ethers. The high-boiling polar organic solvent is generally used in an amount of 0.3 to 50 times the weight of the oligomer. Polypropylene glycol, polyethylene glycol, tetraethylene glycol or the like may be used as a solubilizing agent for the oligomer in combination with the high-boiling polar organic solvent as needed. The depolymerization temperature of the glycolic acid oligomer is generally 230° C. or higher, preferably 230 to 320° C. Although the depolymerization is performed under atmospheric pressure or reduced pressure, it is preferable to heat the oligomer under a reduced pressure of 0.1 to 90.0 kPa (1 to 900 mbar) to depolymerize it.

A cyclic ester purified to a water content of at most 60 ppm (by weight), preferably at most 50 ppm, more preferably at most 40 ppm, is preferably used as the cyclic ester. If the initial water content in the cyclic ester used is too high, the controllable range of melt viscosity and molecular weight of the resulting polymer are limited even when water is added as the molecular weight-adjusting agent.

The content of hydroxycarboxylic compounds contained as impurities in the cyclic ester is preferably as low as possible. The content of an α-hydroxycarboxylic acid in the cyclic ester is preferably at most 200 ppm (by weight), more preferably at most 150 ppm, still more preferably at most 130 ppm, particularly preferably at most 100 ppm.

Linear α-hydroxycarboxylic acid oligomers are generally contained in the cyclic ester. Most of these oligomers are linear α-hydroxycarboxylic acid dimmer. The content of the linear α-hydroxycarboxylic acid oligomers in the cyclic ester is preferably at most 2,000 ppm (by weight), more preferably at most 1,500 ppm, still more preferably at most 1,200 ppm, particularly preferably at most 1,000 ppm.

Cyclic esters such as glycolide and lactide undergo hydrolysis reaction and polymerization reaction with a minute amount of water contained as impurities during their storage and thus show a tendency to increase the contents of α-hydroxycarboxylic acids and α-hydroxycarboxylic acid oligomers. Therefore, it is desirable that the water content in the cyclic ester just after purification is at most 50 ppm, the α-hydroxycarboxylic acid content is at most 100 ppm, and the linear α-hydroxycarboxylic acid oligomer content is at most 1,000 ppm. Incidentally, the purification of the cyclic ester may be performed by combining a recrystallization treatment, a drying treatment and the like with each other in accordance with a method known per se in the art.

2. Production Process for Aliphatic Polyester

In order to produce an aliphatic polyester using the cyclic ester, it is preferred to adopt a process comprising heating the cyclic ester to cause ring-opening polymerization. This ring-opening polymerization process is performed substantially a bulk. The ring-opening polymerization is conducted at a temperature within a range of generally 100 to 270° C., preferably 120 to 260° C. in the presence of a catalyst.

No particular limitation is imposed on the catalyst so far as it may be used as a ring-opening polymerization catalyst for respective cyclic esters. Specific examples of such catalysts include metallic compounds such as oxides, chlorides, carboxylates and alkoxides of tin (Sn), titanium (Ti), aluminum (Al), antimony (Sb), zirconium (Zr) and zinc (Zn). More specifically, preferable examples thereof include tin compounds such as tin halides (for example, tin dichloride, tin tetrachloride, etc.) and organic tin carboxylates (for example, tin octanoates such as tin 2-ethylhexanoate); titanium compounds such as alkoxytitanium; aluminum compounds such as alkoxyaluminum; zirconium compounds such as zirconium acetylacetone; and antimony halides. However, these are not exhaustive.

The amount of the catalyst used may be in a small amount relative to the cyclic ester and is selected from a range of generally 0.0001 to 0.5% by weight, preferably 0.001 to 0.1 wt. % based on the cyclic ester.

In the preset invention, the contents of water and hydroxycarboxylic compounds contained as impurities in the cyclic ester are determined prior to the ring-opening polymerization to calculate a total proton quantity in the in the impurities based on the respective contents, and setting the water content in the cyclic ester to a value exceeding 80 ppm, particularly a value exceeding 100 ppm. The water content in the cyclic ester may be measured by means of a Karl Fischer's aquameter. The α-hydroxycarboxylic acids and linear α-hydroxycarboxylic acid oligomers contained in the cyclic ester are determined by gas chromatographic analysis or the like after the respective carboxylic groups are converted into alkyl ester groups.

The total proton concentration of the impurities contained in the cyclic ester is calculated on the basis of the total quantity of the hydroxycarboxylic compounds and water contained as impurities in the cyclic ester. In the case of, for example, glycolide, minute amounts of water and hydroxycarboxylic compounds composed of glycolic acid and linear glycolic acid oligomers are contained as the impurities. Most of the linear glycolic acid oligomers contained in purified glycolide are a dimer of glycolic acid. In the case of lactide, water, lactic acid and linear lactic acid oligomers are contained as the impurities. The proton concentration (mol %) based on these hydroxycarboxylic compounds is calculated on the basis of the contents and molecular weights of the respective compounds and the number of hydroxyl groups (generally one hydroxyl group). The proton concentration (mol %) of water is calculated on the basis of the content and molecular weight of water. The proton concentration is calculated as mol % based on the total amount of the cyclic ester and impurities.

The total proton concentration of the impurities contained in the cyclic ester is preferably 0.01 to 0.5 mol %, more preferably 0.02 to 0.4 mol %, particularly preferably 0.03 to 0.35 mol %. Since there is a certain limit to lowering of the contents of the hydroxycarboxylic compounds by purification, it is difficult to extremely lower the total proton concentration of the impurities. If the total proton concentration of the impurities is too high, it is difficult to precisely control the melt viscosity and molecular weight of the resulting polymer by addition of water.

In the present invention, water is added to a cyclic ester purified down to a water content of preferably at most 60 ppm to adjust the total proton concentration in the cyclic ester, thereby controlling the molecular weight of an aliphatic polyester formed. The total proton concentration in the cyclic ester is controlled within a range of preferably higher than 0.09 mol %, but lower than 2.0 mol %, more preferably 0.1 to 1.0 mol % by adding water to the purified cyclic ester.

Based on the molecular weight of the resultant aliphatic polyester, it is possible to predict the setting of molding conditions and the mechanical properties and yellowness of the molded products.

When ring-opening polymerization is conducted without adding water to the purified cyclic ester, an unreacted monomer is liable to remain in a polymer formed. If the content of volatile matter comprising the remaining monomer as a main component becomes high, the melt viscosity of the resulting polymer is lowered in addition to deterioration of its quality, and the yellowness index is also made high. It is difficult to control the melt viscosity or the like of the resulting polymer by mere control of the degree of purification of the cyclic ester.

When the total proton concentration in a purified cyclic ester is controlled by adding water to the cyclic ester, the physical properties of a polymer formed, such as melt viscosity, molecular weight and yellowness index can be precisely controlled.

If water is used as a molecular weight-adjusting agent, it becomes possible to elevate the reaction efficiency of the ring-opening polymerization and remarkably reduce the content of volatile matter which is principally composed of the residual monomer. In other words, when water is used as the molecular weight-adjusting agent, a polymer having a high molecular weight and a high melt viscosity can be synthesized. When the total proton concentration in the cyclic ester is changed by addition of water, the melt viscosity and molecular weight of the polymer formed can be controlled within the desired respective ranges while reducing the amount of the volatile matter (residual monomer) to a low level. As a result, a close correlation is attained between the total proton concentration in the cyclic ester and the melt viscosity or molecular weight of the polymer.

More specifically, such a correlation as described above can be clarified by conducting ring-opening polymerization under the same polymerization conditions (reaction vessel, polymerization temperature, polymerization time, the kind and purification degree of the monomer used, etc.) except that the total proton concentration in the cyclic ester is changed by changing the amount of water added, and measuring the melt viscosities, molecular weights and yellowness indexes of the resulting aliphatic polyesters, and by using the measured results as a database.

For example, the total proton concentration was changed by adding water to glycolide, and the melt viscosity, weight average molecular weight and yellowness index of polyglycolic acid obtained by ring-opening polymerization of the glycolide were measured. As a result, it was proved that these respective physical properties can be correlated to the total proton concentration.

For example, FIG. 1 provides a data plot showing a correlation between weight-average molecular weights (Mw) of aliphatic polyesters produced by changing the addition amounts of water and total proton concentrations (including data of Examples the prior invention denoted by "●" and data of Examples of the present invention denoted by "Δ").

Figure 2:
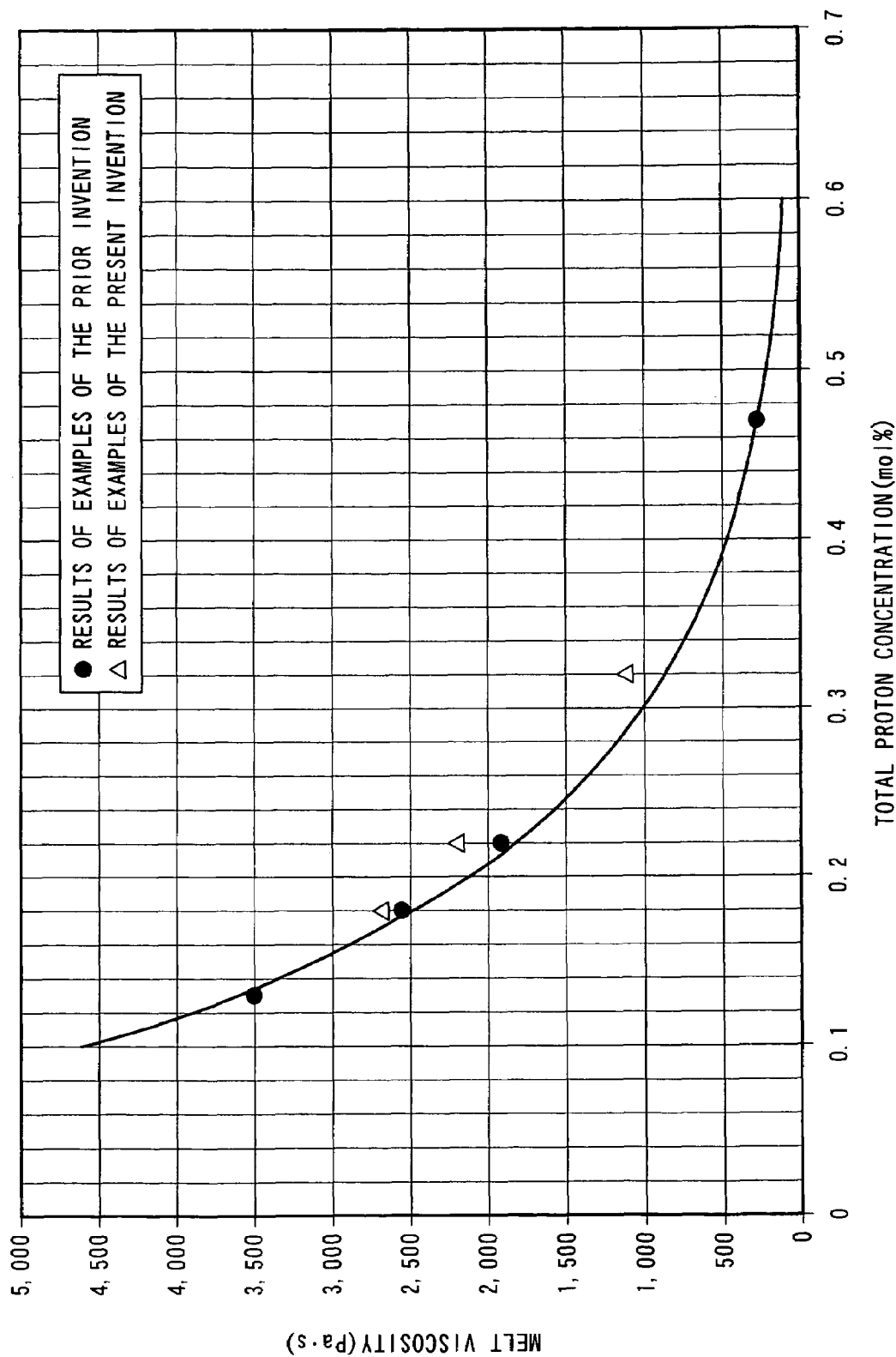
FIG. 2 is a data plot showing a correlation between melt viscosities of aliphatic polyesters obtained through the production process according to the present invention and total proton concentrations in cyclic ester.

In order to carry out the regression analysis on the basis of the database, for example, the total proton concentration (x) is used as an independent variable (explanatory variable), and the melt viscosity (y) of the polyglycolic acid is used as a dependent variable (explained variable). As the result of the regression analysis, it was found that relational expressions of a linear model, a double logarithm model and a semilogarithm model are established between them. It was proved that among these, the relational expression of the semilogarithm model represented by the following expression (1):

$$y = a \cdot b^x \quad (1)$$

wherein a and b are parameters, results in the highest in multiple correlation R and multiple determination $R^2$. FIG. 2 provides a data plot showing a correlation between the melt viscosities and the total proton concentration along with a correlation curve obtained in the above-described manner.

When the amount of water added is increased to raise the total proton concentration in the cyclic ester, the melt viscosity and molecular weight of a polymer formed become low. However, it has been found that its yellowness index (YI) becomes low in reverse proportion to the amount to improve the degree of coloring. Accordingly, the total proton concentration in the cyclic ester can be controlled by addition of water, thereby producing an aliphatic polyester having a low melt viscosity suitable for injection molding or the like and a low yellowness index. As it is possible to suppress the coloring of the polymer by using water as a molecular weight-adjusting agent, it becomes possible to provide a good balance with an improvement of moisture resistance while suppressing an increase of coloring liable to be increased by the addition of a carboxyl group-capping agent.

The ring-opening polymerization of the cyclic ester may be optionally conducted by means of a polymerization vessel or in an extruder according to the kind of the monomer used. However, it is generally preferable to adopt a method of conducting bulk ring-opening polymerization in the polymerization vessel. For example, when glycolide is heated, it is melted in a liquid state, whereas a polymer is formed when the heating is continued to subject the melt to ring-opening polymerization. In a polymerization reaction system whose polymerization temperature is lower than a crystallization temperature of a polymer formed, a polymer is precipitated in the course of the polymerization reaction, and a solid polymer is finally obtained. The polymerization time varies according to the method of the ring-opening polymerization, polymerization temperature, etc. However, it is generally 10 minutes to 100 hours, preferably 30 minutes to 50 hours, more preferably 1 to 30 hours. The conversion of polymerization is generally at least 95%, preferably at least 98%, more preferably at least 99%. It is however the most preferred that the monomer be fully converted from the viewpoints of decreasing the residual amount of unreacted monomer and enhancing production efficiency.

Accordingly, in the present invention, it is preferred to adopt a process of adding water to a purified cyclic ester to control the total proton concentration in the cyclic ester, heating and melting the cyclic ester in the presence of a catalyst and then subjecting the cyclic ester to ring-opening polymerization in the molten state. This polymerization process is a bulk ring-opening polymerization process. The ring-opening polymerization of a cyclic ester in a moltent state may be performed by using a reaction vessel or a tubular, columnar or extruder-type reaction vessel in a batch or in a continuous manner.

In the present invention, it is preferred to adopt a process of transferring a cyclic ester in a molten state to a polymerization apparatus equipped with a plurality of tubes (including those having both ends capable of opening and closing as preferable embodiments) and effecting the ring-opening polymerization in each tube placed in a hermetic state to precipitate the resultant polymer. It is also preferred to adopt a process of proceeding with ring-opening polymerization of a molten cyclic ester in a reaction vessel equipped with a stirrer, taking up the resultant polymer to once cool and solidify the polymer and then further continuing solid-phase polymerization below the melting point of the polymer. These processes may be performed either batchwise or in a continuous manner. In any case, by adopting a method of controlling the polymerization temperature in a hermetic state (i.e., in a reaction system with no gaseous phase), it is possible to produce a polymer having target molecular weight and physical properties, such as melt viscosity, stably and at a good reproducibility.

According to the process of the present invention, polyglycolic acid having a melt viscosity of preferably 50 to 6,000

Pa·s, more preferably 100 to 5,000 Pa·s as measured at a temperature of 240° C. and a shear rate of 121 sec$^{-1}$ can be provided by ring-opening polymerization of a cyclic ester (for example, glycolide or a cyclic ester comprising glycolide as a main component). According to the process of the present invention, a high-molecular weight aliphatic polyester having a weight-average molecular weight of preferably at least 50,000, more preferably 80,000, particularly preferably at least 100,000 can be produced. The upper limit of the weight-average molecular weight is about 500,000.

The aliphatic polyester produced in the above manner is compounded (i.e., formed into a compound) with a carboxyl group-capping agent. As the carboxyl group-capping agent, it is possible to use compounds generally known as moisture resistance-improving agents for aliphatic polyesters such as polylactic acid (refer to, e.g., Patent document 5 mentioned above). Examples thereof may include: carbodiimide compounds inclusive of monocarbodiimides and polycarbodiimides, such as N,N-2,6-diisopropylphenylcarbodiimides; oxazoline compounds, such as 2,2'-m-phenylene-bis(2-oxazoline), 2,2'-p-phenylenebis(2-oxazoline), 2,2-phenyl-2 oxazoline and styrene-isopropenyl-2-oxazoline; oxazine compounds, such as 2-methoxy-5,6-dihydro-4H-1,3-oxazine; and epoxy compounds, such as N-glycidyldiphthalimide and cyclohexene oxide.

Among these, carbodiimide compounds are preferred, and particularly those having a high purity can exhibit an excellent moisture resistance-stabilizing effect.

These carboxyl group-capping agents can be used in combination of two or more species, as desired, and may preferably be used in a proportion of 0.01-10 wt. parts, more preferably 0.05-5 wt. parts, particularly 0.1-3 wt. parts, per 100 wt. parts of the aliphatic polyester.

The aliphatic polyester can be further compounded with 0.003-3 wt. parts, preferably 0.005-1 wt. part, of a thermal stabilizer per 100 wt. parts thereof in addition to the carboxyl group-capping agent. As the thermal stabilizer, phosphoric acid esters having a pentaerythritol skeleton and phosphoric acid alkyl esters may preferably be used singly or in combination.

The above-mentioned carboxyl group-capping agent (and optionally added thermal stabilizer) can be added during the polymerization, but may preferably be added at the time of formation of pellets of the aliphatic polyester produced by polymerization. They can also be added both in the course of pelletization and during polymerization.

EXAMPLES

The present invention will hereinafter be described more specifically by the following Syntheses Examples, Examples and Comparative Examples. Analyzing methods, measuring methods, calculating methods, etc. are as follows:

(1) Impurity Determining Analysis:

A precisely weighed amount (ca. 1 g) of glycolide and 25 mg of 4-chlorobenzophenone as an internal standard substance were added into 10 ml of high-purity acetone and sufficiently dissolved therein. Ca. 1 ml of the resultant solution was taken out, and an ethyl ether solution of diazomethane was added to the solution. The diazomethane solution was added in an amount of leaving a yellow color of diazomethane as an approximate measure. The yellow-colored solution (2 μl) was charged into a gas chromatograph to determine methyl-esterified glycolic acid and a glycolic acid dimmer on the basis of an area ratio of the internal standard substance and the amounts of the glycolide and internal standard substance added.

<Conditions of Gas Chromatographic Analysis>
Apparatus: Hitachi G-3000,
Column: TC-17 (0.25 mm in diameter×30 m in length),
Temperature of vaporizing chamber: 290° C.,
Column temperature: After retained at 50° C. for 5 minutes, raising the temperature to 270° C. at a heating rate of 20° C./min and holding at 270° C. for 4 minutes, and
Detector: FID (flame ionization detector), temperature: 300° C.

With respect to lactide, impurities were determined in the same manner as in glycolide.

(2) Quantitative Determination of Water:

A Karl Fischer's aquameter ("CA-100", made by Mitsubishi Kagaku K.K.) equipped with a vaporizer (VA-100) was used, and a precisely weighed amount (ca. 2 g) of a polymer sample was placed in the vaporizer preset to 220° C. and heated. A dry nitrogen gas was passed at a flow rate of 250 ml/min through the Karl Fischer's aquameter from the vaporizer. After the sample was introduced into the vaporizer, water vaporized was introduced into a Karl Fischer's solution. An end point was determined to be a point of time when an electric conductivity was lowered to +0.1 μg/S from the background. With respect to the determination of water in a monomer, the temperature of the vaporizer was preset to 140° C., and an end point was determined to be a point of time an electric conductivity was lowered to +0.05 μg/S from the background.

(3) Determination of Water in Monomer-Melting Vessel:

Dry air was allowed to flow in the interior of a monomer-melting vessel in advance to find a relative humidity of its atmosphere by means of a hydrometer. An absolute temperature was calculated from a temperature of the atmosphere to calculate out an amount of water from this absolute temperature and the volume of the vessel.

(4) Calculating Method of Proton Concentration:

A total proton concentration in a cyclic ester is calculated on the basis of the total amount of hydroxycarboxylic compounds and water contained in the cyclic ester. A proton concentration (mol %) based on the hydroxycarboxylic compounds is calculated on the basis of the contents and molecular weights of the respective compounds and the number of hydroxyl groups. On the other hand, a proton concentration (mol %) based on water is calculated on the basis of the total amount of water of impurities contained in the cyclic ester, water contained in the atmosphere of a treating vessel, etc., and water added and the molecular weight of water.

Details of the calculation method for Polymer Synthesis Example 1 described hereafter are as follows.

<Molecular Weight>

The following values were used as molecular weights of respective components in the glycolide (cyclic ester) monomer.

glycolide: 116.07
glycolic acid: 76.05
glycolic acid dimer: 134.09
Water: 18.02.

<Proton Concentration of Impurities in the Charged Monomer>

The concentrations (weight basis) of impurities in the charged glycolide were 50 ppm of glycolic acid, 360 ppm of glycolic acid dimer and 33 ppm of water. As the molecular weight of glycolide is 116.07, proton concentrations given by the respective impurities can be calculated in the following manner:

glycolic acid: 50 ppm $$116.07 \times 50 \times 10^{-6} \div 76.05 \times 100 = 0.0076 \text{ mol \%} \quad (i)$$

glycolic acid dimer: 360 ppm $$116.07 \times 360 \times 10^{-6} \div 134.09 \times 100 = 0.031 \text{ mol \%} \quad (ii)$$

water: 33 ppm $$116.07 \times 33 \times 10^{-6} \div 18.02 \times 100 = 0.021 \text{ mol \%} \quad (iii)$$

Total proton concentration given by the impurities $$(i)+(ii)+(iii)=0.0076+0.031+0.021=0.0596 \approx 0.060 \text{ mol \%} \quad (iv)$$

<Water in the Monomer Dissolution Vessel>

The atmosphere in the reaction vessel (volume: 50 liters) after removing the moisture as far as possible by blowing in dry air exhibited: temperature=22.5° C. and relative humidity=31%.

As data from Chemical Engineer's Handbook, saturation vapor pressure of water at 22.5° C.=2726 Pa so that the relative humidity of 31% corresponds to an absolute vapor pressure of 2726×0.31=845.1 Pa. As the volume of 1 mol of water in the standard state (0° C.=273.2K, 1 atm=101325 Pa) is 22.4 liters=0.0224 m$^3$, an absolute moisture (in terms of grams per 1 m$^3$) can be calculated as follows:

$$18.02 \times (845.1/101325) \times 1/(0.0224 \times (273.2+22.5)/273.2) = 0.00794 \times 845.1/(1+0.0366 \times 22.5) = 6.199 \approx 6.2 \text{ g/m}^3$$

(Incidentally, the absolute moisture can also be measured directly by a hygrometer (e.g., "HMI 41T", made by Vasala Co.).

The moisture corresponds to an amount of water in the inner volume of 56 liter of the dissolution vessel of 6.2×0.056=0.347 g. This corresponds to a concentration in 22500 g (=194.0 mol) of glycolide monomer of $$0.347/22500 \times 10^6 = 15 \text{ ppm}$$

$$(0.347/18.02) \div 194 \times 100 = 0.010 \text{ mol \%} \quad (v)$$

<Added Water>

3.85 g of water was added, giving a concentration with respect to 22500 g (=194.06 mol) of glycolide monomer as follows:

$$3.85/22500 \times 10^6 = 171.11 \text{ ppm}$$

$$(3.85/18.02) \div 194 \times 100 = 0.110 \text{ mol \%} \quad (vi)$$

<Total Proton Concentration>

$$(iv)+(v)+(vi)=0.060+0.010+0.110=0.180 \text{ mol \%}.$$

Incidentally, a portion of the content in the monomer dissolution vessel was sampled after charging glycolide and adding water and heating to provide a uniform state for quantitative analysis of impurities (water, glycolic and glycolic acid dimer) to determine a total proton concentration after charging and dissolution of glycolide, which exhibited a good agreement with the calculated total proton concentration based on the impurities (moisture, glycolic acid and glycolic acid dimer) in the glycolide before charging and the amount of added water.

(5) Melt Viscosity:

A polymer sample was placed in a drying oven heated to 120° C. and brought into contact with dry air to reduce its water content to 100 ppm or lower. Thereafter, the sample was sufficiently dried in the drying oven. The melt viscosity was measured by means of a Capirograph 1-C (made by K.K. Toyo Seiki Seisakusho) equipped with a capillary (1 mm in diameter×10 mm in length). After ca. 20 g of the sample was placed in the apparatus heated to a presetting temperature of 240° C. and held for 5 minutes, the melt viscosity was measured at a shear rate of 121 sec$^{-1}$.

(6) Color:

A color was measured by means of a TC-1800 (made by Toyo Denshoku Gijutsu Center) in accordance with a reflected light measuring method under conditions of standard light C, a visual field of 2° and a calorimetric system. The apparatus was calibrated by a standard white plate (No. 88417). The measurement was conducted 3 times with respect to a ground product sample packed in the closest packing state free from fine powder in a specified Petri dish (diameter: 3 cm, height: 1.3 cm), mounting the Petri dish on a measuring stage and changing the position of the sample, and an average value thereof was calculated. The color was indicated in terms of a YI (yellowness index) value.

(7) Measurement of Molecular Weight:

An amorphous polymer was provided and dissolved in a solvent for measurement of a molecular weight. More specifically, ca. 5 g of a sample fully dried was held between aluminum plates, placed on a hot press heated to 275° C., heated for 90 seconds and then pressed for 60 seconds under a pressure of 2 MPa. Thereafter, the polymer was immediately dipped in iced water to be quenched. Thus, a transparent amorphous pressed sheet was produced.

A sample (10 mg) was cut out of the thus-prepared pressed sheet. This sample was dissolved in a solution with 5 mM of sodium trifluoroacetate dissolved in hexafluoroisopropanol (HFIP) to prepare a 10 ml of a solution. After the sample solution was filtered through a membrane filter, it was charged into a gel permeation chromatograph (GPC) to measure its molecular weight. Incidentally, the sample was charged into GPC within 30 minutes after the dissolution.

<Conditions of GPC Measurement>

Apparatus: Shimadzu LC-9A,

Column: HFIP-806M,2 columns and pre-column were connected in series,

Column temperature: 40° C.,

Eluent: HFIP solution with 5 mM of sodium trifluoroacetate, Flow rate: 1 ml/min, Detector: Differential refractive index detector (RI), and Molecular weight calibration: Five standard PMMAs having different molecular weights were used.

(8) Determination of Carboxyl Group Content

Ca. 0.3 g of sample was taken out and accurately weighed from a press sheet prepared in the same manner as the sample for molecular weight determination, and was completely dissolved in 10 ml of reagent-grade dimethyl sulfoxide in ca. 3 minutes on an oil bath at 150° C. To the resultant solution, 2-3 drops of an indicator (bromo-thymol blue dissolved in alcohol), and 0.02N-sodium hydroxide, benzyl alcohol solution was added until a termination point which was judged by observation with eyes as a point of color change of the solution from yellow to green. From the amount of addition until the termination point, a carboxyl group concentration was calculated.

(9) Evaluation of Moisture Resistance.

A pellet sample was sufficiently dried with dry air at 120° C., placed on a hot press at 250° C. for 3 min. of heating and then subjected to application of a pressure of 8 MPa. Immediately thereafter, the sample was cooled by transferring to a press apparatus cooled with circulating water and pressed at 5 MPa for ca. 5 min., to provide a transparent amorphous pressed sheet.

A sample in a prescribed size was cut out from the above-prepared press sheet and fixed on a frame to be placed in a drying oven for heating at 70° C. for 1 min., followed by blow stretching at an areal ratio of 10-15 times by blowing air thereto. The thus-obtained film was fixed on a frame and heat-treated for 1 min. at 200° C.

Ca. 10 mg of samples were cut out from the above-prepared sample in a film state and left standing for prescribed periods in a vessel at constant temperature and humidity of 80° C. and 95% RH. Then, the samples were taken out to measure molecular weights thereof by GPC.

Polymerization degrees were calculated from the thus-measured number-average molecular weights, and reciprocals thereof were plotted on a logarithmic scale verses the standing periods to take a slope of an approximate straight line of the plots as a hydrolysis rate constant.

(10) Determination of Carbodiimide Purity

In 10 ml of high purity acetone, accurately weighed ca. 50 mg of N,N-2,6-diisopropylphenylcarbodiimide was completely dissolved. The solution was sampled in 2 μl and injected into a gas chromatograph for measurement. The determination was made based on a proportion of main peak of N,N-2,6-diisoprophlphenylcorbodiimide to a total peak area determined by removing the area of a peak attributable to the solvent.

<Conditions for the Gas Chromatography>
  Apparatus: Shimadzu GC-14A
  Column: TC-17 0.25 mm-dia.×30 m-length
  Temperature of vaporization chamber: 290° C.
  Column temperature: Held at 150° C. for 5 min., heated to 270° C. at a rate of 20° C./min. and held at 270° C. for 6 min.
  Detector: FID (hydrogen flame ionization detector) at 300° C.

Monomer Syntheses Example 1

A vessel (also referred to as "reaction vessel") equipped with an agitator and a jacket was charged with a 70% by weight aqueous solution of glycolic acid. While agitating under atmospheric pressure, the solution within the vessel was heated to a temperature of 200° C. by circulating a heat transfer oil into the jacket to conduct a condensation reaction while distilling off water formed out of the system. While reducing the pressure within the vessel stepwise to 3 kPa in a state that the reaction mixture within the vessel was kept at 200° C., low-boiling substances such as the water formed and an unreacted raw material were distilled off to obtain a glycolic acid oligomer.

The glycolic acid oligomer prepared above was charged into a SUS304-made vessel equipped with an agitator and a jacket, diethylene glycol dibutyl ether as a solvent was added, and polyethylene glycol as a solubilizing agent was further added. A mixture of the glycolic acid oligomer and the solvent was subjected to a depolymerization reaction under heat and reduced pressure, and glycolide formed was distilled out together with the solvent. The distillate was condensed in a double-pipe condenser through which hot water was circulated. The condensate was received by a receiver at room temperature. The solvent in an amount corresponding to the amount of the solvent distilled out was continuously supplied to the reaction vessel for the purpose of keeping the amount of the solvent in the reaction mixture constant.

The reaction was continued to distill out a mixture of glycolide and the solvent, and the distillate was condensed. Glycolide separated out from the condensate was subjected to solid-liquid separation and recrystallized with 2-propanol and then vacuum-dried. The purity of the resultant glycolide was 99.99% as determined by means of a differential scanning calorimeter (DSC).

Monomer Synthesis Example 2

A condensate was obtained in the same manner as in Synthesis Example 1 except that the solubilizing agent was changed from polyethylene glycol to octyltetratriethylene glycol. The condensate was received by a receiver having a jacket through which hot water was circulated. The condensate within the receiver was separated into 2 liquid layers, in which an upper layer was the solvent, and a lower layer was liquid glycolide. Even after the 2 layers were formed, the depolymerization reaction was continued, and the co-distillation was continued. As a result, glycolide cooled by the condenser was passed in the form of droplets through the solvent layer and merged by condensation within the lower glycolide layer. The upper solvent layer was continuously returned to the reaction vessel for the purpose of keeping the amount of the solvent in the reaction mixture constant. The pressure of the reaction system was temporally returned to atmospheric pressure to take out the liquid glycolide from a bottom of the receiver. The pressure was restored again to continue the depolymerization reaction. This process was repeated several times.

The glycolide recovered from the depolymerization reaction system was purified by the recrystallization in Syntheses Example 1, whereas the glycolide was purified by means of a tower type purifier in this Example. After the depolymerization, crude glycolide crystals obtained by solid-liquid separation were continuously charged at a constant rate into a charging port for drude crystals provided at a lower part of the tower-type purifier. The glycolide was agitated by an agitator installed in the interior of the tower-type purifier wherein the crude glycolide was caused for purification by countercurrent contact between a falling melt of a purified crystal component with the rising crude glycolide crystals within the purifier. The crystals after the purification were continuously discharged at a fixed rate from a take-off port provided at an upper part of the purifier. The purity of the purified glycolide recovered was at least 99.99% as determined by means of DSC.

Polymer Syntheses Example 1

Production of PGA Sample A

A 56-liter SUS-made closable container (melting vessel) equipped with a steam jacket structure and an agitator was charged with 22,500 g of the glycolide prepared in Synthesis Example 1 (and containing 50 ppm of glycolic acid, 360 ppm of glycolic acid dimer and 33 ppm of water giving a total proton concentration of 0.060 mol %), 0.068 g (30 ppm) of tin dichloride dihydrate and 3.85 g of water (determined by taking into account 0.34 g of water (moisture) contained in the atmosphere of the melting vessel to adjust the total proton concentration to 0.18 mol %.

The container was closed, and steam was circulated in the jacket to heat the contents to 100° C. under agitation. The contents became a uniform liquid in the course of the heating. While keeping the temperature of the contents at 100° C., they were transferred to an apparatus comprising tubes made of a metal (SUS304) and each having an inner diameter of 24 mm. The apparatus was composed of a body part, in which the tubes were provided, and upper and lower plates made of a metal (SUS304) and so constructed that all the body part and upper and lower plates were equipped with a jacket, and a heat transfer oil was circulated in the jacket. When the contents were transferred to this apparatus, the contents were charged from an upper opening of each tube of which the lower opening had been closed with the lower plate fitted thereto. After completion of the transfer, the upper plate was immediately fitted to close the upper opening. The heat transfer oil heated to 170° C. was circulated in the jacket parts of the body part and upper and lower plates, and the contents were held for 7 hours. After the prescribed period of time, the heat transfer oil circulated in the jacket parts was cooled, thereby cooling the polymerization equipment to nearly room temperature. After the cooling, the lower plate was removed to take out the resultant polyglycolic acid in a bulk state from the lower opening. According to this polymerization system, the yield reached almost 100%. The bulk product was pulverized to obtain PGA Sample A.

PGA Sample A contained 34 ppm of water and exhibited a weight-average molecular weight (Mw) of 193000, a melt viscosity (MV) of 2690 Pa·s and a yellowness index (YI) of 11.

Polymer Synthesis Example 2

Production of PGA Sample B

PGA Sample B was prepared in the same manner as in Polymer Synthesis Example 1 except for using 22500 g of glycolide prepared in Synthesis Example 2 (containing 70 ppm of glycolic acid, 420 ppm of glycolic acid dimer and 10 ppm of water giving a total proton concentration of 0.053 mol %) and adding 5.54 g of water (determined by taking into account 0.27 g of moisture contained in the atmosphere in the vessel) so as to provide a total proton concentration (designed proton concentration) of 0.22 mol %.

Sample B contained 35 ppm of water and exhibited Mw=184000, MV=2200 Pa·s and a yellowness index (YI)= 8.7.

Polymer Synthesis Example 3

Production of PGA Sample C

PGA Sample C was prepared in the same manner as in Polymer Synthesis Example 2 except for adding 11.5 g of water (determined by taking into account 0.4 g of moisture contained in the atmosphere in the vessel) so as to provide a total proton concentration (designed proton concentration) of 0.32 mol %.

Sample C contained 30 ppm of water and exhibited Mw=154000, MV=1100 Pa·s and a yellowness index(YI)= 6.2.

Polymer Synthesis Example 4

Production of PGA Sample D

PGA Sample D was prepared in the same manner as in Polymer Synthesis Example 1 except for using, as monomers, 21375 g of glycolide prepared in Synthesis Example 2 (containing 60 ppm of glycolic acid, 460 ppm of glycolic acid dimer and 21 ppm of water giving a total proton concentration of 0.063 mol %) and 1125 g of L-lactide (containing 0 ppm of lactic acid, 270 ppm of lactic acid dimer and 8 ppm of water giving a total impurity concentration of 0.030 mol %), adding 3.85 g of water (determined by taking into account 0.27 g of moisture contained in the atmosphere in the vessel) so as to provide a total proton concentration (designed proton concentration of 0.18 mol %, and circulating a heat transfer oil at 170° C. to the jacket and warming the upper and lower plates at 170° C. After the polymerization, the resultant poly (glycolic acid/L-lactic acid) copolymer in a bulk state was recovered at a yield of almost 100% and pulverized to obtain PGA Sample D.

Sample D contained 25 ppm of water and exhibited Mw=181000, MV=2300 Pa·s and a yellowness index (YI)= 18.

Examples, Comparative Examples

Examples 1-4 and Comparative Examples 1-2

Pellet samples were prepared by blending 1 wt. part each of different grades of N,N-2,6-diisopropylphenylcabodiimide having different purities (CDI-A and CDI-B) respectively with 100 wt. parts of PGA Sample A prepared in Polymer Synthesis Example 1 and melt-kneading through a small-size twin-screw extruder. The extrusion was performed under 2 temperature conditions. Pellet samples of Comparative Examples 1 and 2 were provided by omitting N,N-2,6-diisopropylphenylcarbodiimide.

<Extrusion Conditions>

Extruder: "LT-20", made by K.K. Toyo Seiki Seisakusho.

Temperatures; Condition 1: maximum temperature of 240° C.

Condition 2: maximum temperature of 280° C.

A film for evaluation of moisture resistance was prepared from each pellet sample.

Physical properties of the pellets and films are shown in Table 1.

Examples 5-10 and Comparative Examples 3-5

Pellet samples and film samples were prepared in the same manner as in Example 1 except for blending 0.03 wt. part of cyclic neopentane-tetra-il-bis(octadecylphosphite) ("ADEKASTAB PEP-8", made by Asahi Denka Kogyo K.K.) or mono- and di-stearyl acid phosphate ("ADEKASTAB AX-71", made by Asahi Denka Kogyo K.K.) with 100 wt. parts of sufficiently dried PGA Sample A prepared in Polymer Synthesis Example 1 and 1 wt. part each of different grades of N,N-2,6-diisopropylphenylcarbodiimide having different impurities (CDI-A, CDI-B and CDI-C) and setting the extruder maximum temperature to 240° C. (Condition-1). Samples of Comparative Examples 3-5 were prepared by omitting N,N-2,6-diisopropylphenylcarbodiimide.

Physical properties of the pellets and film samples are shown in Table 2.

Examples 11-16 and Comparative Example 6

Pellet samples and film samples were prepared in the same manner as in Example 1 except for blending 0.03 wt. part of cyclic neopentane-tetra-il-bis(octadecylphosphite) ("ADEKASTAB PEP-8", made by Asahi Denka Kogyo K.K.) with 100 wt. parts of sufficiently dried PGA Sample B prepared in Polymer Synthesis Example 2 and 0.01-5 wt. parts of N,N-2, 6-diisopropylphenylcarbodiimide (CDI-B) and setting the extruder maximum temperature to 240° C. (Condition-1). A sample of Comparative Example 6 was prepared by omitting N,N-2,6-diisopropylphenylcarbodiimide.

Physical properties of the pellets and film samples are shown in Table 3.

Examples 17-18 and Comparative Examples 7-8

Pellet samples and film samples were prepared in the same manner as in Example 1 except for blending 0.03 wt. part of cyclic neopentane-tetra-il-bis(octadecylphosphite) ("ADEKASTAB PEP-8", made by Asahi Denka Kogyo K.K.) or mono- and di-stearyl acid phosphate ("ADEKASTAB AX-71", made by Asahi Denka Kogyo K. K.) with 100 wt. parts of sufficiently dried PGA Sample C prepared in Polymer Synthesis Example 3 and 1 wt. part each of different grades of N,N-2,6-diisopropylphenylcarbodiimide having different impurities and setting the extruder maximum temperature to 240° C. (Condition-1). Samples of Comparative Examples 7 and 8 were prepared by omitting N,N-2,6-diisopropylphenylcarbodiimide.

Physical properties of the pellets and film samples are shown in Table 4.

Examples 19-20 and Comparative Example 9

Pellet samples were prepared by blending 0.03 wt. part of cyclic neopentane-tetra-il-bis(octadecylphosphite) ("ADEKASTAB PEP-8", made by Asahi Denka Kogyo K.K.) with 100 wt. parts of sufficiently dried PGA Sample A prepared in Polymer Synthesis Example 1 and 1 wt. part or 2 wt. parts, N,N-2,6-diisopropylphenylcarbodiimide (CDI-B) and melt-kneading through a large-size twin-screw extruder.

<Extrusion Conditions>
Extruder: "TEM-41SS" (40 mm-dia.), made by Toshiba Kikai K.K.
Screw: Equi-directional rotation. L/D=4.15. Rotation speed=40 rpm
Temperature condition: maximum temperature=240° C.
Extrusion rate: 30 kg/h The resultant pellets were sufficiently dried with dry air at 120° C. and formed into ca. 100 μm-thick sheets through a single-screw extruder.

<Extrusion Conditions>
Extruder: "UNITRUDER PEX-40-24H" (40 mm-dia.) made by Pla Giken K.K.
Screw: Single full-flight type, L/D=24, rotation speed=30 rpm
Die: T-die
Temperature condition: Maximum temperature=270° C.
Extrusion rate: 10 kg/h.

Thereafter, each sheet thus-obtained was stretched under the following conditions by using a biaxial stretching test apparatus (made by K.K. Toyo Seiki Seisakusho) to prepare a ca. 6 μm-thick amorphous film.

<Stretching conditions>
Sheet size: 100 mm×100 mm
Preheating temperature: 60° C.
Preheating time: 20 seconds
Stretching ratios: 4×4 times (longitudinally 4 times and laterally 4 times).

Each film thus obtained was fixed on a frame and heat-treated for 1 min. at 500° C.

Physical properties of the pellet and film samples are shown in Table 5. Incidentally, a sample of Comparative Example 9 was prepared by omitting N,N-2,6-diisopropylphenylcarbodiimide.

Example 21 and Comparative Example 10

Pellet samples and film samples were prepared in the same manner as in Example 1 except for blending 0.03 wt. part of cyclic neopentane-tetra-il-bis(octadecylphosphite) ("ADEKASTAB PEP-8", made by Asahi Denka Kogyo K.K.) with 100 wt. parts of sufficiently dried PGA Sample D prepared in Polymer Synthesis Example 4 and 1 wt. part of N,N-2,6-diisopropylphenylcarbodiimide having different impurities and changing the extruder maximum temperature to 230° C. A sample of Comparative Example 10 was prepared by omitting N,N-2,6-diisopropylphenylcarbodiimide.

Physical properties of the pellets and film samples are shown in Table 6.

Examples 22-24

Pellet samples and film samples were prepared in the same manner as in Example 1 except for blending 0.03 wt. part of cyclic neopentane-tetra-il-bis(octadecylphosphite) ("ADEKASTAB PEP-8", made by Asahi Denka Kogyo K.K.) with 100 wt. parts of sufficiently dried PGA Sample B prepared in Polymer Synthesis Example 2 and 1 wt. part each of three grades of N,N-2,6-diisoprophlphenylcarbodiimide and setting the extruder maximum temperature to 240° C. (Condition-1).

Physical properties of the pellets and film samples are shown in Table 7.

Examples 25-27

Pellet samples and film samples were prepared in the same manner as in Example 1 except for blending 0.03 wt. part of cyclic neopentane-tetra-il-bis(octadecylphosphite) ("ADEKASTAB PEP-8", made by Asahi Denka Kogyo K.K.) with 100 wt. parts of sufficiently dried PGA Sample B prepared in Polymer Synthesis Example 2 and 1 wt. part each of two grades of epoxy resins and setting the extruder maximum temperature to 240° C. (Condition-1).

Physical properties of the pellets and film samples are shown in Table 8.

Examples 28-32 and Comparative Example 11

Pellet samples and film samples were prepared in the same manner as in Example 1 except for blending 0.03 wt. part of cyclic neopentane-tetra-il-bis(octadecylphosphite) ("ADEKASTAB PEP-8", made by Asahi Denka Kogyo K.K.) with 100 wt. parts of sufficiently dried PGA Sample A prepared in Polymer Synthesis Example 1 and 0.3-1 wt. part of 5 grades of epoxy resins and changing the extruder maximum temperature to 250° C. A sample of Comparative Example 11 was prepared by omitting the epoxy resin.

Physical properties of the pellets and film samples are shown in Table 9.

TABLE 1

|  |  | Example ||||||
|---|---|---|---|---|---|---|---|
|  |  | 1 | 2 | 3 | 4 | Comp. 1 | Comp. 2 |
| Pelletizing (melt-kneading) conditions | | | | | | | |
| Blocking agent | | CDI-A | CDI-A | CDI-B | CDI-B | None | None |
| Addition amount | wt. part | 1 | 1 | 1 | 1 | 0 | 0 |
| Extrusion temp. | °C. | 240 | 280 | 240 | 280 | 240 | 280 |
| Properties of polymer pellets | | | | | | | |
| Moisture | ppm | 24 | 27 | 31 | 31 | 31 | 38 |
| Melt viscosity (MV) | Pa·s | 1,360 | 980 | 1,370 | 790 | 1,730 | 920 |
| Weight-average molecular weight (Mw) | — | 162,300 | 132,100 | 149,800 | 133,200 | 174,300 | 133,000 |
| Number-average molecular weight (Mn) | — | 67,600 | 58,700 | 57,900 | 53,200 | 74,100 | 54,000 |
| Polydisperse factor (Mw/Mn) | — | 2.4 | 2.3 | 2.6 | 2.5 | 2.4 | 2.5 |
| Yellowness index (YI) | — | 41 | 55 | 45 | 34 | 28 | 59 |
| Carboxylic acid concentration | eq/t | 11 | 16 | 22 | 20 | 31 | 40 |
| Film property | | | | | | | |
| Hydrolysis rate constant ($\times 10^{-5}$) | 1/s | 2.8 | 3.9 | 3.2 | 3.3 | 4.5 | 4.6 |

CDI-A: N,N-2,6-diisopropylphenylcarbodiimide (purity: 94.8%) ("DIPC", made by Kawaguchi Kagaku Kogyo K.K.)
CDI-B: N,N-2,6-diisopropylphenylcarbodiimide (purity: 84.5%) ("STABAXOL 1", made by Sumitomo Kagaku Bayer K.K.)

TABLE 2

|  |  | Example |||||
|---|---|---|---|---|---|---|
|  |  | 5 | 6 | 7 | 8 | 9 |
| Pelletizing (melt-kneading) conditions | | | | | | |
| Thermal stabilizer | | PEP-8 | PEP-8 | AX-71 | PEP-8 | PEP-8 |
| Addition amount | wt. part | 0.03 | 0.03 | 0.03 | 0.03 | 0.03 |
| Blocking agent | | CDI-A | CDI-A | CDI-A | CDI-B | CDI-B |
| Additions amount | wt. part | 1 | 1 | 1 | 1 | 1 |
| Extrusion temp. | °C. | 240 | 280 | 280 | 240 | 240 |
| Properties of polymer pellets | | | | | | |
| Moisture | ppm | 60 | 32 | 55 | 44 | 51 |
| Melt viscosity (MV) | Pa·s | 2,090 | 1,380 | 2,290 | 1,830 | 960 |
| Weight-average molecular weight (Mw) | — | 203,100 | 177,200 | 193,600 | 198,400 | 167,900 |
| Number-average molecular weight (Mn) | — | 84,000 | 77,800 | 92,400 | 90,700 | 72,800 |
| Polydisperse factor (Mw/Mn) | — | 2.4 | 2.3 | 2.1 | 2.2 | 2.3 |
| Yellowness index (YI) | — | 34 | 49 | 42 | 39 | 50 |
| Carboxylic acid concentration | eq/t | 5 | 6 | 4 | 5 | 7 |
| Film property | | | | | | |
| Hydrolysis rate constant ($\times 10^{-5}$) | 1/s | 2.0 | 1.8 | 2.6 | 2.5 | 2.4 |

|  |  | Example ||||
|---|---|---|---|---|---|
|  |  | 10 | Comp. 3 | Comp. 4 | Comp. 5 |
| Pelletizing (melt-kneading) conditions | | | | | |
| Thermal stabilizer | | AX-71 | PEP-8 | PEP-8 | AX-71 |
| Addition amount | wt. part | 0.03 | 0.03 | 0.03 | 0.03 |
| Blocking agent | | CDI-C | None | None | None |
| Additions amount | wt. part | 1 | 0 | 0 | 0 |
| Extrusion temp. | °C. | 240 | 240 | 280 | 240 |
| Properties of polymer pellets | | | | | |
| Moisture | ppm | 16 | 36 | 44 | 20 |
| Melt viscosity (MV) | Pa·s | 1,520 | 2,030 | 1,380 | 2,180 |
| Weight-average molecular weight (Mw) | — | 205,000 | 218,000 | 195,500 | 225,300 |
| Number-average molecular weight (Mn) | — | 87,500 | 91,600 | 94,100 | 94,500 |
| Polydisperse factor (Mw/Mn) | — | 2.3 | 2.4 | 2.1 | 2.4 |
| Yellowness index (YI) | — | 42 | 25 | 44 | 37 |
| Carboxylic acid concentration | eq/t | 12 | 25 | 26 | 29 |

TABLE 2-continued

| Film property | | | | | |
|---|---|---|---|---|---|
| Hydrolysis rate constant (×10$^{-5}$) 1/s | 2.5 | 4.4 | 4.6 | 4.6 |

CDI-A: N,N-2,6-diisopropylphenylcarbodiimide (purity: 94.8%) ("DIPC", made by Kawaguchi Kagaku Kogyo K.K.)
CDI-B: N,N-2,6-diisopropylphenylcarbodiimide (purity: 84.5%) ("STABAXOL 1", made by Sumitomo Kagaku Bayer K.K.)
CDI-C: N,N-2,6-diisopropylphenylcarbodiimide (purity: 96.2%) ("Stabilizer7000F", made by Raschig Co.)
PEP-8: cyclic neopentane-tetra-il-bis (octadecylphosphite) ("ADEKASTAB PEP-8", made by Asahi Denka Kogyo K.K.)
AX-71: mono- and di-stearyl acid phosphate ("ADEKASTAB AX-71", made by Asahi Denka Kogyo K.K.)

TABLE 3

| | | Example | | | | | | |
|---|---|---|---|---|---|---|---|---|
| | | 11 | 12 | 13 | 14 | 15 | 16 | Comp. 6 |
| Pelletizing (melt-kneading) conditions | | | | | | | | |
| Thermal stabilizer | | PEP-8 | PEP-8 | PEP-8 | PEP-8 | PEP-8 | PEP-8 | PEP-8 |
| Addition amount | wt. part | 0.03 | 0.03 | 0.03 | 0.03 | 0.03 | 0.03 | 0.03 |
| Blocking agent | | CDI-B | CDI-B | CDI-B | CDI-B | CDI-B | CDI-B | None |
| Additions amount | wt. part | 0.1 | 0.5 | 1 | 2 | 3 | 5 | 0 |
| Properties of polymer pellets | | | | | | | | |
| Moisture | ppm | 14 | 19 | 16 | 18 | 12 | 14 | 0.8 |
| Melt viscosity (MV) | Pa·s | 930 | 830 | 810 | 780 | 1,090 | 1,030 | 1,370 |
| Weight-average molecular weight (Mw) | — | 185,100 | 159,100 | 145,900 | 154,600 | 178,400 | 164,300 | 190,000 |
| Number-average molecular weight (Mn) | — | 85,800 | 74,900 | 73,300 | 71,100 | 90,700 | 88,200 | 90,100 |
| Polydisperse factor (Mw/Mn) | — | 2.2 | 2.1 | 2.0 | 2.2 | 2.0 | 1.9 | 2.1 |
| Carboxylic acid concentration | eq/t | 25 | 19 | 13 | 5 | 4 | 4 | 29 |
| Film property | | | | | | | | |
| Hydrolysis rate constant (×10$^{-5}$) | 1/s | 4.0 | 2.4 | 1.7 | 1.0 | 2.3 | 1.4 | 4.5 |

CDI-B: N,N-2,6-diisopropylphenylcarbodiimide (purity: 84.5%) ("STABAXOL 1", made by Sumitomo Kagaku Bayer K.K.)
PEP-8: cyclic neopentane-tetra-il-bis (octadecylphosphite) ("ADEKASTAB PEP-8", made by Asahi Denka Kogyo K.K.)

TABLE 4

| | | Example | | | |
|---|---|---|---|---|---|
| | | 17 | 18 | Comp. 7 | Comp. 8 |
| Pelletizing (melt-kneading) conditions | | | | | |
| Thermal stabilizer | | PEP-8 | AX-71 | PEP-8 | AX-71 |
| Addition amount | wt. part | 0.03 | 0.03 | 0.03 | 0.03 |
| Blocking agent | | CDI-A | CDI-A | Noen | None |
| Additions amount | wt. part | 1 | 1 | 0 | 0 |
| Properties of polymer pellets | | | | | |
| Moisture | ppm | 25 | 18 | 20 | 14 |
| Melt viscosity (MV) | Pa·s | 900 | 1,000 | 1,000 | 1,100 |
| Weight-average molecular weight (Mw) | — | 143,000 | 148,000 | 148,000 | 152,000 |
| Number-average molecular weight (Mn) | — | 60,000 | 59,000 | 62,000 | 61,000 |
| Polydisperse factor (Mw/Mn) | — | 2.4 | 2.5 | 2.4 | 2.4 |
| Carboxylic acid concentration | eq/t | 8 | 6 | 37 | 36 |
| Film property | | | | | |
| Hydrolysis rate constant (×10$^{-5}$) | 1/s | 2.4 | 2.0 | 4.4 | 4.4 |

CDI-A: N,N-2,6-diisopropylphenylcarbodiimide (purity: 94.8%) ("DIPC", made by Kawaguchi Kagaku Kogyo K.K.)
PEP-8: cyclic neopentane-tetra-il-bis (octadecylphosphite) ("ADEKASTAB PEP-8", made by Asahi Denka Kogyo K.K.)
AX-71: mono- and di-stearyl acid phosphate ("ADEKASTAB AX-71", made by Asahi Denka Kogyo K.K.)

TABLE 5

| | | Example | | |
|---|---|---|---|---|
| | | 19 | 20 | Comp. 9 |
| Pelletizing (melt-kneading) conditions | | | | |
| Thermal stabilizer | | PEP-8 | PEP-8 | PEP-8 |
| Addition amount | wt. part | 0.03 | 0.03 | 0.03 |
| Blocking agent | | CDI-B | CDI-B | None |
| Additions amount | wt. part | 1 | 2 | 0 |
| Properties of polymer pellets | | | | |
| Moisture | ppm | 22 | 25 | 28 |
| Melt viscosity (MV) | Pa·s | 1,700 | 1,400 | 2,200 |
| Weight-average molecular weight (Mw) | — | 178,100 | 160,200 | 204,000 |
| Number-average molecular weight (Mn) | — | 78,200 | 69,700 | 85,610 |
| Polydisperse factor (Mw/Mn) | — | 2.3 | 2.3 | 2.4 |
| Carboxylic acid concentration | eq/t | 17 | 6 | 35 |
| Film property | | | | |
| Hydrolysis rate constant ($\times 10^{-5}$) | 1/s | 0.2 | 0.2 | 4.0 |

CDI-B: N,N-2,6-diisopropylphenylcarbodiimide (purity: 84.5%) ("STABAXOL 1", made by Sumitomo Kagaku Bayer K.K.)
PEP-8: cyclic neopentane-tetra-il-bis (octadecylphosphite) ("ADEKASTAB PEP-8", made by Asahi Denka Kogyo K.K.)

TABLE 6

| | | Example | |
|---|---|---|---|
| | | 21 | Comp. 10 |
| Pelletizing (melt-kneading) conditions | | | |
| Thermal stabilizer | | PEP-8 | PEP-8 |
| Addition amount | wt. part | 0.03 | 0.03 |
| Blocking agent | | CDI-B | None |
| Additions amount | wt. part | 1 | 0 |
| Properties of polymer pellets | | | |
| Moisture | ppm | 27 | 28 |
| Melt viscosity (MV) | Pa·s | 1,370 | 2,140 |
| Weight-average molecular weight (Mw) | — | 164,900 | 201,700 |
| Number-average molecular weight (Mn) | — | 75,500 | 91,100 |
| Polydisperse factor (Mw/Mn) | — | 2.2 | 2.2 |
| Carboxylic acid concentration | eq/t | 17 | 29 |
| Film property | | | |
| Hydrolysis rate constant ($\times 10^{-5}$) | 1/s | 1.7 | 4.4 |

CDI-B: N,N-2,6-diisopropylphenylcarbodiimide (purity: 84.5%) ("STABAXOL 1", made by Sumitomo Kagaku Bayer K.K.)
PEP-8: cyclic neopentane-tetra-il-bis (octadecylphosphite) ("ADEKASTAB PEP-8", made by Asahi Denka Kogyo K.K.)

TABLE 7

| | | Example | | |
|---|---|---|---|---|
| | | 22 | 23 | 24 |
| Pelletizing (melt-kneading) conditions | | | | |
| Thermal stabilizer | | PEP-8 | PEP-8 | PEP-8 |
| Addition amount | wt. part | 0.03 | 0.03 | 0.03 |
| Blocking agent | | CDI-P | DDC | DIC |
| Additions amount | wt. part | 1 | 1 | 1 |
| Properties of polymer pellets | | | | |
| Moisture | ppm | 4 | 8 | 6 |
| Melt viscosity (MV) | Pa·s | 1,800 | 1,000 | 800 |
| Weight-average molecular weight (Mw) | — | 152,700 | 148,900 | 135,800 |
| Number-average molecular weight (Mn) | — | 63,900 | 64,500 | 59,900 |
| Polydisperse factor (Mw/Mn) | — | 2.4 | 2.3 | 2.3 |
| Carboxylic acid concentration | eq/t | 25 | 11 | 13 |
| Film property | | | | |
| Hydrolysis rate constant ($\times 10^{-5}$) | 1/s | 2.4 | 1.7 | 2.1 |

CDI-P: polycarbodiimide ("STABAXOL P", made by Sumitomo Kagaku Bayer K.K.)
DDC: N,N'-dicyclohexylcarbodiimide (made by Kanto Kagaku K.K.)
DIC: 1,3-diisopropylcarbodiimide (made by Kawaguchi Kagaku Kogyo K.K.)
PEP-8: cyclic neopentane-tetra-il-bis (octadecylphosphite) ("ADEKASTAB PEP-8", made by Asahi Denka Kogyo K.K.)

TABLE 8

| | | Example | | |
|---|---|---|---|---|
| | | 25 | 26 | 27 |
| Pelletizing (melt-kneading) conditions | | | | |
| Thermal stabilizer | | PEP-8 | PEP-8 | PEP-8 |
| Additions amount | wt. part | 0.03 | 0.03 | 0.03 |
| Blocking agent | | EP-A | EP-B | EP-B |
| Addition amount | wt. part | 0.5 | 1 | 1 |
| Properties of polymer pellets | | | | |
| Moisture | ppm | 18 | 7 | 38 |
| Melt viscosity (MV) | Pa·s | 670 | 460 | 850 |
| Weight-average molecular weight (Mw) | — | 133,400 | 121,500 | 188,100 |
| Number-average molecular weight (Mn) | — | 64,300 | 58,700 | 99,400 |
| Polydisperse factor (Mw/Mn) | — | 2.1 | 2.1 | 1.9 |
| Carboxylic acid concentration | eq/t | 22 | 16 | 16 |

TABLE 8-continued

| | | Example | | |
|---|---|---|---|---|
| | | 25 | 26 | 27 |
| Film property | | | | |
| Hydrolysis rate constant (×10$^{-5}$) | 1/s | 3.1 | 2.9 | 3.3 |

EP-A: N-glycidylphthalimide ("DECONAL EX-731", made by Nagase Kasei K.K.)
EP-B: p-t-butylphenyl glycidyl ether ("DECONAL EX-146", made by Nagase Kasei
PEP-8: cyclic neopentane-tetra-il-bis (octadecylphosphite) ("ADEKASTAB PEP-8", made by Asahi Denka Kogyo K.K.)

TABLE 9

| | | Example | | | | | |
|---|---|---|---|---|---|---|---|
| | | 28 | 29 | 30 | 31 | 32 | Comp. 11 |
| Pelletizing (melt-kneading) conditions | | | | | | | |
| Thermal stabilizer | | PEP-8 | PEP-8 | PEP-8 | PEP-8 | PEP-8 | PEP-8 |
| Addition amount | wt. part | 0.03 | 0.03 | 0.03 | 0.03 | 0.03 | 0.03 |
| Blocking agent | | EP-C | EP-D | EP-E | EP-F | EP-G | None |
| Additions amount | wt. part | 1 | 0.3 | 1 | 1 | 1 | 0 |
| Properties of polymer pellets | | | | | | | |
| Moisture | ppm | 17 | 20 | 25 | 19 | 24 | 21 |
| Melt viscosity (MV) | Pa · s | 1,760 | 690 | 430 | 580 | 620 | 1,560 |
| Weight-average molecular weight (Mw) | — | 268,200 | 173,800 | 182,700 | 215,400 | 179,100 | 226,100 |
| Number-average molecular weight (Mn) | — | 142,500 | 73,400 | 97,100 | 125,000 | 106,400 | 119,100 |
| Polydisperse factor (Mw/Mn) | — | 1.9 | 2.4 | 1.9 | 1.7 | 1.7 | 1.9 |
| Carboxylic acid concentration | eq/t | 15 | 12 | 12 | 16 | 12 | 25 |
| Film property | | | | | | | |
| Hydrolysis rate constant (×10$^{-5}$) | 1/s | 3.3 | 3.0 | 2.7 | 3.4 | 3.1 | 4.2 |

EP-C: cyclohexene oxide (made by Kanto Kagaku K.K.)
EP-D: bis(3,4-epoxycyclohexyl)ethyltrimethylsilane ("KMB-303", made by Shin-Etsu Kagaku K.K.)
EP-E: trimethylolpropane polyglycidyl ether ("SR-TMP", made by Sakamoto Yakuhin Kogyo K.K.)
EP-F: 3,4-epoxycyclohexyl ("ARALDITE CY-179", made by Bantico Co.)
EP-G: phenyl glycidyl ether ("EPIOL P", made by Nippon Yushi K.K.)
PEP-8: cyclic neopentane-tetra-il-bis (octadecylphosphite) ("ADEKASTAB PEP-8", made by Asahi Denka Kogyo K.K.)

INDUSTRIAL APPLICABILITY

The results shown in Tables 1-9 above respectively show that by compounding an aliphatic polyester obtained by ring-opening polymerization of a cyclic ester while using water positively as an initiator or/and a molecular weight-adjusting agent with various carboxyl group-capping agents, the carboxylic acid content of and the hydrolysis rate of films obtained from the resultant aliphatic polyester can be effectively reduced, and therefore an aliphatic-polyester improved in moisture resistance can be obtained.

The invention claimed is:

1. A process for producing an aliphatic polyester, comprising:
    subjecting a cyclic ester containing water in excess of 80 ppm which functions as an initiator or/and a molecular weight-adjusting agent to ring-opening polymerization while controlling a total concentration in a range of above 0.09 mol % and below 2.0 mol % of proton-sources including water, free α-hydroxy carboxylic acid and dimer thereof corresponding to the cyclic ester in the cyclic ester so as to provide a desired weight-average molecular weight of resultant aliphatic polyester by varying the content of the water in the cyclic ester, and compounding the resultant aliphatic polyester with a carboxyl group-capping agent.

2. A production process according to claim 1, wherein the carboxyl group-capping agent is selected from the group consisting of monocarbodiimides, polycarbodiimides, oxazolines, oxazines and epoxy compounds.

3. A production process according to claim 1, wherein the carboxyl group-capping agent is a monocarbodiimide.

4. A production process according to claim 1, wherein the total concentration of proton-sources including more than 80 ppm of water is adjusted by adding water to a purified cyclic ester containing at most 60 ppm of water.

5. A production process according to claim 1, wherein the total concentration of proton-sources in the cyclic ester is calculated based on a total of hydroxycarboxylic acid compounds and water contained as impurities in the cyclic ester.

6. A production process according to claim 5, wherein the hydroxycarboxylic acids comprise an α-hydroxycarboxylic acid and linear oligomer of α-hydroxycarboxylic acid.

7. A production process according to claim 1, wherein the cyclic ester comprises glycolide alone or a mixture of at least 60 wt. % of glycolide and at most 40 wt. % another cyclic monomer copolymerizable with glycolide by ring-opening polymerization.

8. A production process according to claim 1, wherein the cyclic ester after adjusting the total concentration of proton-sources therein is melted under heating in the presence of a catalyst and then the molten cyclic ester is subjected to ring-opening polymerization to precipitate a resultant polymer.

9. A production process according to claim 8, wherein the cyclic ester after adjusting the total concentration of proton-sources therein is melted under heating in the presence of a catalyst, then the molten cyclic ester is transferred to a polymerization apparatus equipped with a plurality of tubes, and the cyclic ester is subjected to ring-opening polymerization in an air-tight state within each tube.

10. A production process according to claim 9, wherein the plurality of tubes comprise tubes having both ends that can be open and closed.

11. A production process according to claim 8, wherein the cyclic ester after adjusting the total concentration of proton-sources therein is melted under heating in the presence of a catalyst in a melting vessel, then the molten cyclic ester is subjected to ring-opening polymerization in a reaction vessel equipped with a stirrer, and then a resultant polymer is once cooled to be solidified and subject to solid phase polymerization below the melting point of the polymer.

* * * * *